Open Position

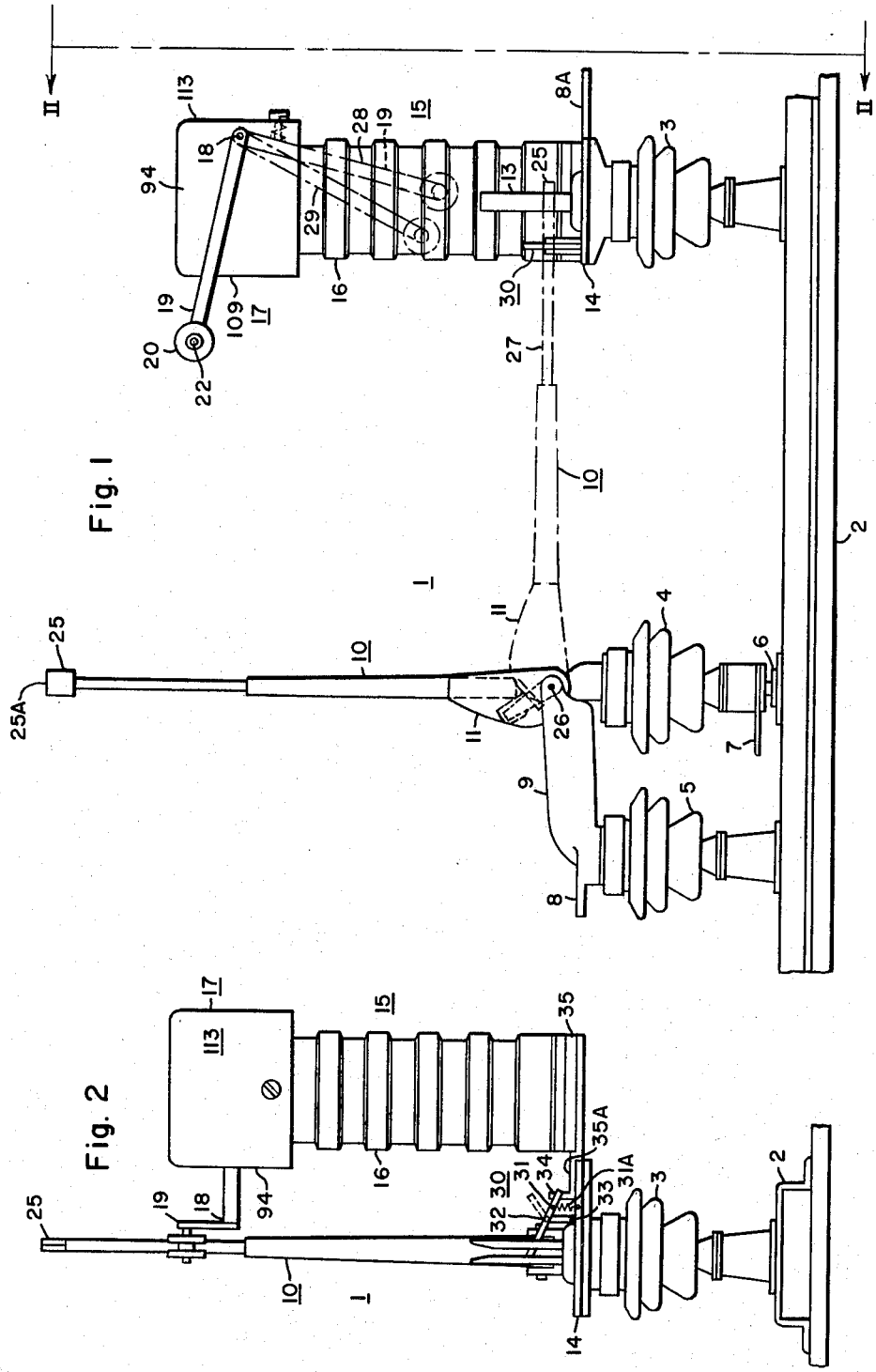

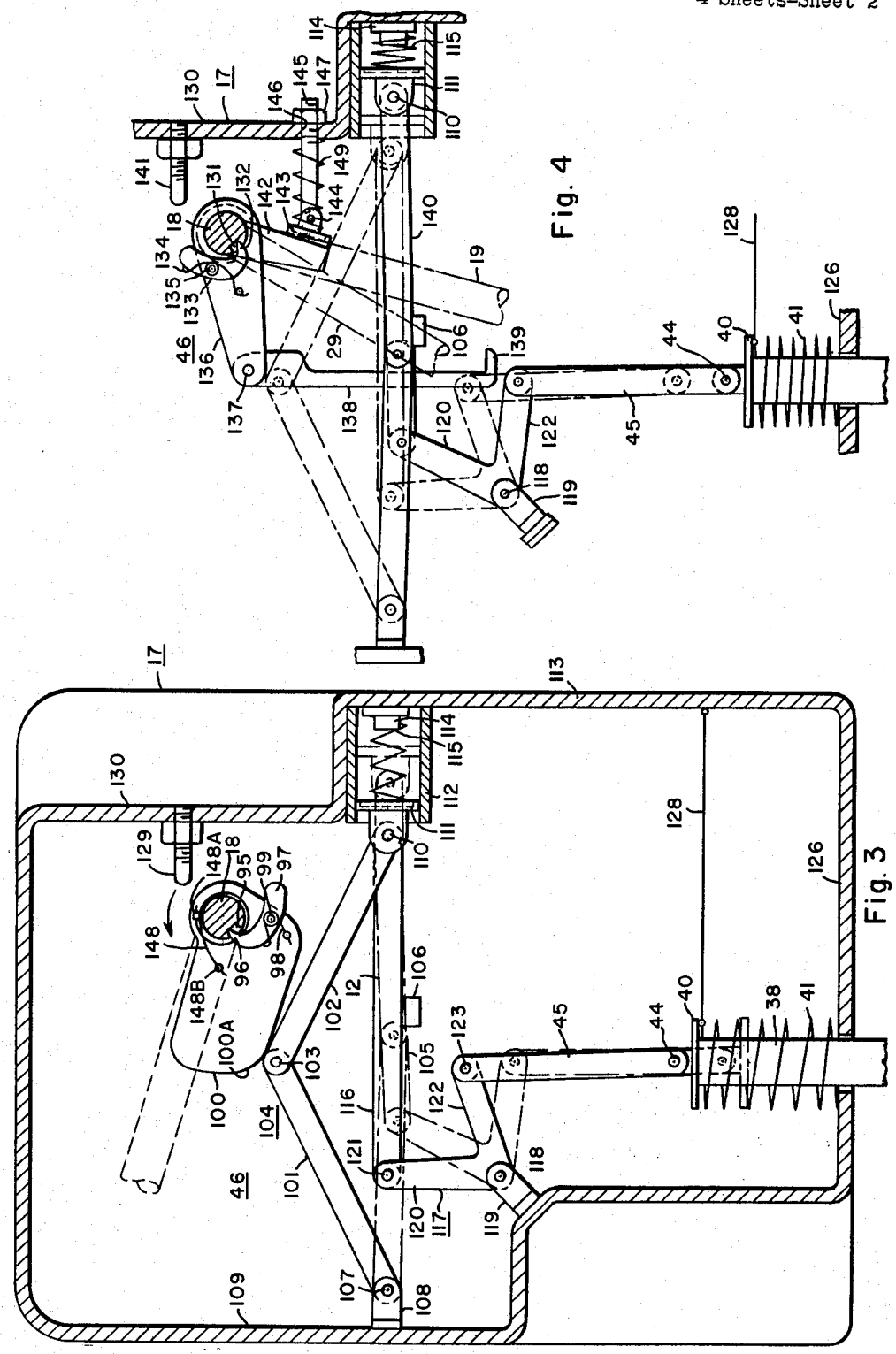

Closed Position

March 20, 1962 J. K. HOWELL ET AL 3,026,395
CIRCUIT INTERRUPTERS
Filed July 10, 1959 4 Sheets-Sheet 4

Closed Position

Open Position

United States Patent Office 3,026,395
Patented Mar. 20, 1962

3,026,395
CIRCUIT INTERRUPTERS
John K. Howell, Kirkwood, Mo., and Floyd A. Bean,
Denver, Colo., assignors to Westinghouse Electric Corporation, East Pittsburgh, Pa., a corporation of Pennsylvania
Filed July 10, 1959, Ser. No. 826,190
5 Claims. (Cl. 200—146)

This invention relates to circuit interrupters in general, and more particularly to arc-extinguishing structures and also to load-break disconnecting switches.

At the present time, outdoor disconnecting switches equipped with arcing horns are sometimes used to interrupt small currents, such as transformer magnetizing currents and line charging currents. These switches have a substantial interrupting ability under favorable conditions; however, if a wind is blowing when the interruption is attempted, there is a considerable danger of the arcs being blown across phases to create a line-to-line fault. The only available device for such interruption, which is completely dependable, is a high-voltage circuit breaker. The high cost of such circuit breakers has led to the considerable use of air-break switches in spite of the hazard involved. There has been a continuous need for a low-cost device with ample capacity to interrupt magnetizing and charging currents, and with more dependable operation than an air-break switch. There have been designed low-cost circuit breakers, usually built in conjunction with disconnecting switches, to fill the need. These devices, however, are essentially circuit breakers with fault-current interrupting ability. Having this ability, the devices are necessarily complex and costly. The need is still great for a simple and inexpensive high-voltage interrupter for load currents only. Such a device is preferably in the form of an addition to existing disconnecting switches to increase their interrupting ability and dependability.

It is, therefore, a general object of the present invention to provide a simple and low-cost, load-break disconnecting switch, which will safely interrupt relatively small currents, and which is capable of also interrupting relatively high-voltage circuits.

Additional requirements, which are desirable in a load-break disconnecting switch, are that the interrupting contacts part at high speed to prevent restriking, particularly when interrupting line-charging current. Preferably such contact opening speed should be independent of the speed of operation of the manual operating handle. Secondly, the addition of the interrupter to the disconnecting switch must not unduly increase the operating effort of the disconnecting switch, and finally the device should preferably operate dependably when covered with snow and ice.

It is, therefore, an additional object of the present invention to provide an improved load-break disconnecting switch, which will not only be highly effective in its interrupting performance, but also it will require relatively little mechanical effort to operate.

Still a further object of the present invention is to improvise an improved interrupting structure which will not only have particular applicability as applied to a load-break disconnecting switch, but, in addition, is suitable for general application, wherever effective circuit interruption is desirable.

A further object of the present invention is to provide an improved operating mechanism for a load-break disconnecting switch.

A further object of the present invention is the provision of an improved load-break disconnecting switch incorporating an auxiliary isolating switch, which functions to remove potential from the contact structure of the interrupting element of the load-break disconnecting switch, when the switch blade is in the closed-circuit position.

A further object of the present invention is the provision of an improved load-break disconnecting switch, in which the operating arm, extending externally of the parallel disposed interrupting element, and operated by the switch blade, in addition, carries current from the switch blade to the interrupting element so as to avoid the necessity of utilizing an auxiliary contact arm, which must be picked up by the switch blade near the end of the opening stroke.

Another object is the provision of an improved toggle-operated mechanism for the inetrrupting element of a load-break disconnecting switch.

Further objects and advantages will readily become apparent upon reading the following specification, taken in conjunction with the drawings, in which:

FIGURE 1 is a side elevational view of the load-break disconnecting switch of the present invention, shown in the fully open-circuit position;

FIG. 2 is an end elevational view of the load-break disconnecting switch, as viewed from the right hand end of FIG. 1 taken substantially along the line II—II of FIG. 1, again the contact structure being illustrated in the open-circuit position;

FIG. 3 is a considerably enlarged vertical sectional view taken through the toggle-operating mechanism for the interrupting element of the load-break disconnecting switch of FIG. 1, the operating and contact elements being illustrated in the fully open-circuit position;

FIG. 4 is a view somewhat similar to FIG. 3, with unimportant housing parts omitted, illustrating the position of the several parts in the fully closed-circuit position of the interrupter;

Figure 5:
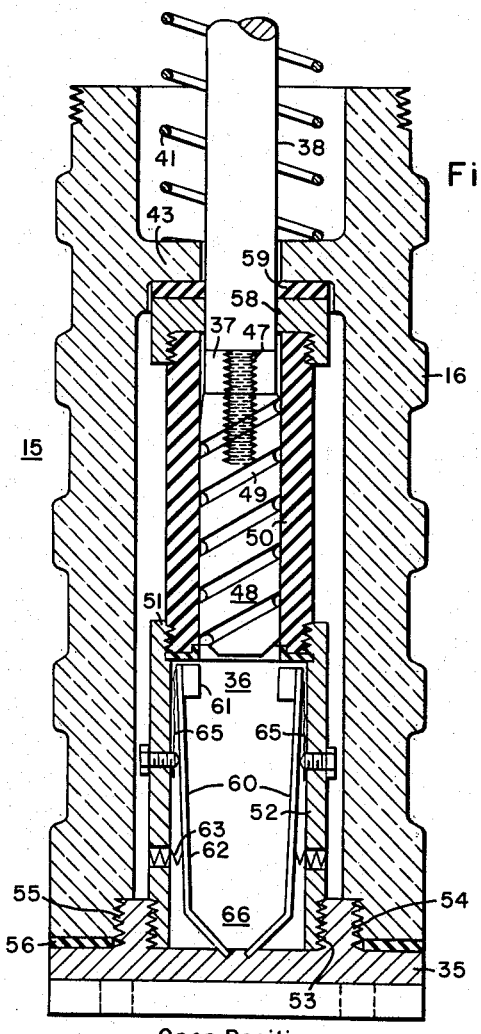
FIG. 5 is a vertical sectional view taken through the interrupting element of the load-break disconnecting switch of FIG. 1, illustrating the position of the contact parts in th efully open-circuit position thereof.

Referring to the drawings, and more particularly to FIG. 1 thereof, the reference numeral 1 generally designates a load-break disconnecting switch including a base 2, upon which upwardly extend insulator stacks 3, 4 and 5. The end insulator stacks 3 and 5 are stationary, whereas the center insulator stack 4 is rotatably mounted with a suitable bearing 6 and rotatably actuated by a crank-arm 7.

The end insulator stack 5 supports a conducting member, or a line terminal connection 8 for the interrupter, and also a housing 9 enclosing a suitable mechanism for rotating the disconnecting switch blade 10 vertically. The mechanism, enclosed within the housing 9 and operated by rotation of the crank-arm 7, forms, per se, no part of our invention, and therefore is not specifically illustrated. Reference may be had to United States Patent No. 2,363,360 issued November 21, 1944 to Herbert L. Rawlins, and assigned to the assignee of the instant application, for a complete description of the mechanism enclosed within housing 9 and also within housing 11.

As mentioned, the rotation of the insulator stack 4, by the crank-arm 7, effects functioning of the mechanism within the housings 9, 11 to thereby effect upward, opening, swinging disconnecting motion of the switch blade 10 out of electrical engagement with the jaw contacts 13 to the fully open position indicated by the full lines in FIG. 1.

The end insulator stack 3 not only fixedly supports the jaw contact 13, but also supports an insulating plate 14, which in turn, supports a laterally disposed interrupting element, generally designated by the reference numeral 15. The interrupting element 15 functions to interrupt the circuit extending through the disconnecting switch 1, such interrupting action taking place interiorly within a weatherproof casing 16, so that no arcing takes place, or is visible externally of the interrupting element 15.

Figure 9:
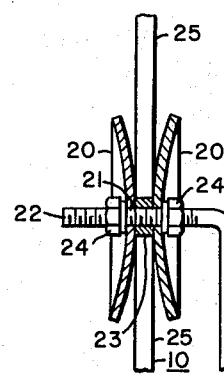

Surmounting the weatherproof casing 16, which is preferably formed of porcelain, is a mechanism compartment 17. Extending laterally externally of the mechanism housing 17 is a main operating shaft 18, to the outer free end of which is fixedly secured an operating contact arm 19. A pair of resilient alloy discs 20 are secured to the outer end of the operating contact arm 19, as more clearly shown in FIG. 9. The resilient alloy discs 20 have apertures 21 therethrough, through which extends a threaded stud 22 extending laterally of the outer free end of the contact arm 19. A spacer sleeve 23 surrounds the stud 22 and spaces the resilient discs 20 a minimum distance apart. Nuts 24, threaded upon the stud 22, fixedly secure the discs 20 in place, in an adjustable manner, so that the outer contacting end 25 of the switch blade 10 may make good resilient contacting engagement with the discs 20 to avoid arcing therebetween, as described more fully hereinafter.

From the description thus far, it is apparent that during the closing operation the switch blade 10 rotates in a clockwise direction about the pivotal mounting 26, engaging the contact arm 19 and rotating the same about the shaft axis 18 until the disconnecting switch blade 10 reaches its fully closed position, as indicated by the dotted lines 27 of FIG. 1. Generally, during a closing operation, the structure is such, that following freeing disengagement between the contact end 25 of switch blade 10 from the discs 20 in the position 28 of FIG. 1, resilient means, as hereinafter described, causes the contact arm 19 to move back to the position 29 of FIG. 1, wherein it is interposed in the path of opening movement of the switch blade 10 during a subsequent opening operation.

An auxiliary isolating switch 30 is provided, including a pivotally mounted contact bar 31, pivotally mounted, as at 32, to a fixed bracket support 33. The right hand end of the contact bar 31, as viewed in FIG. 2, makes separable contacting engagement with a stationary contact 34, which is connected, by a strap connection 35, to the stationary contact structure 36 (FIG. 5) of the interrupting element 15. The isolating switch 30 functions such that when the outer free end 25 of disconnecting switch blade 10 strikes the left hand end of rotatably mounted contact bar 31, as viewed in FIG. 2, in the fully closed-circuit position of the disconnecting switch 1, separation occurs between the contacts 31, 34 of the auxiliary isolating switch 30 to remove potential from the strap connection 35 and the contact structure 36 (now closed) within the interrupting element 15. As a result, in the fully closed-circuit position of the disconnecting switch 1, as indicated by the dotted lines 27 of FIG. 1, the interrupting element 15 is completely electrically isolated from the jaw contact 13 to eliminate charging currents, which might deteriorate the fiber associated with the interrupting element 15 and also cause radio interference.

Figure 6:
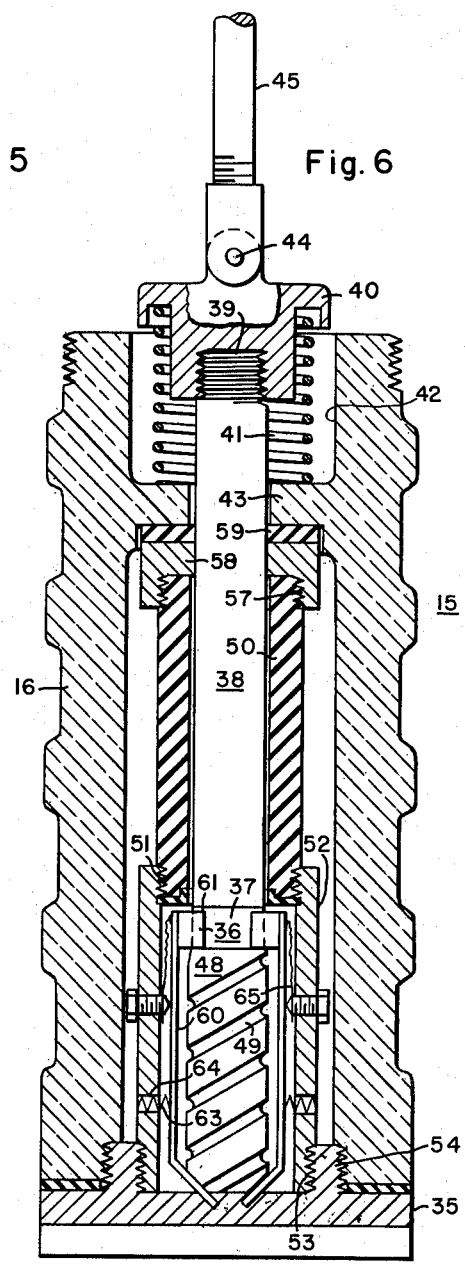
FIG. 6 is a view similar to that of FIG. 5, but showing the fully closed-circuit position of the contact parts.

The interrupting element 15 of the disconnecting switch 1 will now be explained. With reference to FIGS. 5 and 6, it will be noted that cooperating with the finger-type relatively stationary contact structure 36 is an annular movable contact 37, constituting the lower extremity of a contact rod 38, which extends upwardly, and has a threaded engagement, as at 39, to a movable spring seat 40. An opening accelerating compression spring 41 is disposed within a recess 42 provided in the porcelain casing 16, seating at its lower end against a radially inwardly extending flange 43 and against the upper movable spring seat 40. The movable spring seat 40 is, in addition, preferably connected, as at 44, to a link 45, which is connected to the operating mechanism 46 (FIG. 3), which functions to cause contact separation and engagement, as hereinafter described.

The rod-shaped movable contact 38 not only carries the annular arcing contact 37, but also has a threaded engagement, as at 47, with an insulating follower, generally designated by the reference numeral 48. Preferably the insulating follower 48 is formed from a suitable gas-evolving material, such as fiber, or the like, and has formed upon its outer surface one or more spiral grooves 49, which function to restrict arcing. The fiber follower 48 moves with the contact rod 38, being carried thereby. As shown in FIG. 5, during the opening operation the fiber follower 48 moves, with very slight clearance, upwardly into a closely confined insulating tube 50, also preferably formed of a suitable gas-evolving material, such as fiber, or the like.

As a result of the foregoing construction, during the opening operation, when the arcing contact 37 moves from the closed position shown in FIG. 6 to the fully open position, shown in FIG. 5, because of the slight clearance between follower 48 and enclosing tube 50, the established arc drawn between contacts 36, 37 will be forced to assume the path of the one or more of the spiral grooves 49 provided along the outer surface of fiber follower 48. Obviously, therefore, the initial arc length extending rather directly between contacts 36, 37 will be considerably increased in length, by being compelled to follow the spiral or helical path, as defined by the one or more spiral or helical grooves 49 provided by the fiber follower 48.

As shown in FIGS. 5 and 6, the fiber tube 50 is threadedly secured, as at 51, to a cylindrical contact support 52, preferably formed from a steel tube, which is threadedly secured, as at 53, to an annular upstanding boss portion 54 of the base 35. The porcelain casing 16 is likewise threadedly secured, as at 55, to the annular boss portion 54, a gasket 56 being interposed therebetween.

At the upper end of the fiber sleeve 50 is threadedly secured, as at 57, a guide ring 58, which is surmounted by a resilient support washer 59, positioned immediately below the inwardly extending flange portion 43 of the porcelain casing 16.

The contact structure 36 includes a plurality of finger contacts 60. Each finger contact includes an arching-tip portion 61, and a resilient leaf-steel spring portion 62, which is biased inwardly by a compression spring 63 extending through apertures 64 provided in the surrounding steel tube 52. Preferably, resilient flexible current collectors 65 electrically interconnect the leaf springs 60 with the conducting tube 52.

The interrupting action as described aforesaid is highly effective, and quickly brings about interruption of the arc initially drawn between the contacts 36, 37. Gas, which is evolved from the fiber follower 48 and from the fiber enclosing tube 50, is forced downwardly along the helical grooves 49 and into an expansion chamber 66, formed by the lower end of support tube 52. The compression spring 41 insures rapid contact separation and arc extinction.

Figure 7:
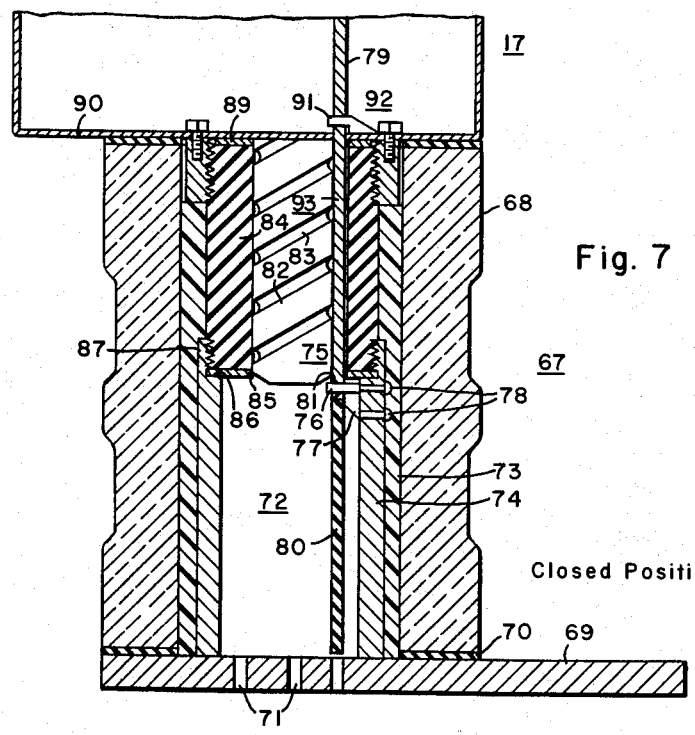
FIG. 7 illustrates a modified type of interrupting structure, which may be substituted for the interrupting structure of FIGS. 5 and 6, the contact parts being shown in the closed-circuit position.
Figure 8:
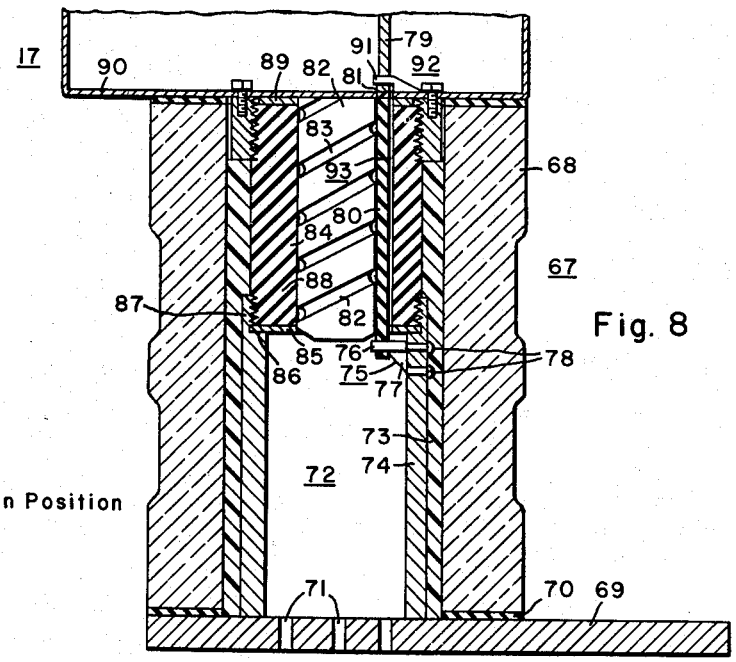
FIG. 8 is a view similar to FIG. 7, but showing the position of the contact parts in the fully open circuit position; and, FIG. 9 is an enlarged detail view of the end of the contact arm.

For certain applications, where it may be difficult to maintain the close tolerances between the fiber tube 50 and the spiraled fiber follower rod 48, required to force the arc drawn between contacts 36, 37 in the one or more spiral grooves 49 an alternate interrupting arrangement to alleviate such design problems is set forth in FIGS. 7 and 8 of the drawings.

With reference to FIGS. 7 and 8, which respectively illustrate the closed and the open-circuit positions of a modified interrupting element 67, it will be noted that again a weatherproof casing 68, preferably composed of porcelain, is provided. In this particular instance, the porcelain casing 68 is supported upon an apertured base plate 69 with a resilient gasket 70 interposed therebetween. Apertures 71 are provided through the base plate 69 for the venting of gas from an expansion chamber 72, provided adjacent the lower end of the modified interrupting element 67. If desired, a condenser element, not shown, could be associated with the apertures 71.

Extending upwardly interiorly within the porcelain casing 68 is an insulating tube 73, composed of any suitable insulating material, such as, for instance, polyethylene. Disposed interiorly of the insulating tube 73 is a metallic condenser tube 74, carrying a relatively stationary contact structure 75 at its upper end. The stationary contact structure, generally designated at 75, may include a pair of resilient fingers 76, supported by a bracket portion 77 from the inner surface of the conducting tube 74 by a plurality of rivets 78.

Cooperating with the contact fingers 76 is a movable contact rod 79, carrying an insulating follower rod 80 therewith. Preferably the follower rod 80 is formed from a suitable gas-evolving material, such as fiber. As shown, the lower end of the conducting rod 79 terminates in an arc-resisting contact 81 capable of resisting arc erosion.

In this modification of the invention there is provided a stationary insulating filler member 82, preferably composed of a suitable gas-evolving material, such as fiber, and having one or more spiral or helical grooves 82 formed upon its outer surface. The filler member 82 is closely enveloped, as shown, by a surrounding insulating tube 84, likewise preferably composed of a suitable gas-evolving material, such as fiber or the like. Preferably, there is provided very slight clearance between the filler member 82 and the surrounding enclosing tube 84. An annular arcing ring 85 seats upon a shoulder portion 86 provided adjacent to the upper threaded end 87 of the conducting tube 74. The construction is such that the lower threaded end 88 of enclosing tube 84 threadedly engages the upper end of the conducting tube 74. A second upper arcing ring 89 is provided at the upper end of the fiber tube 84 immediately below a conducting plate 90, which constitutes a portion of the mechanism housing 17.

In the closed-circuit position of the interrupting element 67, as shown in FIG. 7, the movable conducting rod 79 electrically bridges the lower fingers 76 of the lower relatively stationary contact 75 with the upper contact fingers 91, which constitute a portion of the upper relatively stationary contact structure, generally designated at 92. To effect an opening operation, suitable mechanism, hereinafter described, effects rapid upward opening movement of the contact rod 79. The insulating follower rod 80, preferably formed from fiber, moves upwardly with the contact rod 79, being carried therewith, through a restricted arcing passage 93, disposed between the spiraled grooved filler member 82 and the surrounding fiber tube 84.

The arcing, which is established between the lower end 81 of the contact rod 79 and the relatively stationary contact structure 75 within the restricted arcing passage 93 is compelled, by the presence of the movable fiber follower 80, moving with contact rod 79, to be reestablished through the longer spiral arc path, as defined by the provision of the one or more grooves 83. The evolution of gas from the filler 82, from the surrounding tube 84, and also from the fiber follower rod 80 all contribute to provide an expulsion of gas along the one or more spiral grooves 83 to quickly bring about extinction of the arc therein. Arc extinction quickly occurs because of the cumulative effect of the deionizing influences.

The operating mechanism 46 for the interrupting element 15 of FIG. 1, or for the modified interrupting element 67 of FIGS. 7 and 8, will now be described. With reference to FIGS. 3 and 4 of the drawings, it will be observed that the main operating shaft 18 extends laterally through the side wall 94 (FIG. 1) of the mechanism housing 17. A slot 95 is provided axially along one side of the main shaft 18, into which the nose 96 of a cam pawl 97 is urged by a spiral spring 98. The cam pawl 97 is pivotally mounted, by a pin 99, to a toggle-operating cam plate 100, which is slidably supported upon the main shaft 18. A pair of toggle links 101, 102 are interconnected by a knee pin 103, and collectively constitute a toggle 104, which moves overcenter, in the closed-circuit position of the device, as indicated by the dotted lines 105. In the overcenter position of the toggle 104, the toggle link 102 abuts a stationary stop 106. The left-hand end of the toggle link 101, as viewed in FIG. 3, is pivotally supported, as at 107, to a bracket 108, which extends inwardly from the side wall 109 of the mechanism housing 17. The right-hand end of the toggle link 102, as viewed in FIG. 3, is pivotally connected, as at 110, to a movable spring seat 111, which is guided laterally within a guide tube 112, supported from the side wall 113 of the mechanism housing 17. Disposed within the guide tube 112, between the movable spring seat 111 and a stop 114, is a toggle-compression spring 115, which is compressed in the overcenter position of the toggle 104, as more clearly shown in FIG. 4 of the drawings.

A link 116 is also connected to the pin 110. The other end of the link 116 is pivotally connected by a pin 121 with a bell crank 117, stationarily supported at a fixed pivot 118, provided by a support bracket 119. Thus, one arm 120 of the ball crank 117 is pivotally connected by the pin 121 to the link 116. The other arm 122 of the bell crank 117 is pivotally connected, as at 123, to the link 45, the lower end of which is pivotally connected, as at 44, to the upper end of the conducting operating rod 38. The helical compression spring 41 of FIGS. 5 and 6 is diagrammatically indicated in FIGS. 3 and 4 as being disposed between the lower plate 126 of the mechanism housing 17 and an upper movable spring seat 40.

A flexible connector 128, indicated in FIG. 3, electrically connects the upper end of the conducting operating rod 38 with the conducting mechanism housing 17. An adjustable pawl release 129 is secured to a wall 130 of the mechanism housing 17, as shown in FIG. 3.

FIG. 4 illustrates, fragmentarily, a sectional view taken through the operating mechanism 46 in a different vertical plane than the plane illustrated in the sectional view of FIG. 3. More particularly, with reference to FIG. 4, it will be noted that the main operating shaft 18 has a second pawl engaging slot 131 provided axially along its outer surface. The nose 132 of a toggle-release pawl 133 is biased by a spiral spring 134 encircling the pin 135, about which the release pawl 133 is pivotally mounted. This pin 135 is carried by an arm 136, which is slidable upon the main shaft 18, and is pivotally connected, as at 137, adjacent its outer free end, with a movable toggle breaking arm 138. As shown in FIG. 4, the lower end of the toggle breaking arm 138 has a hook portion 139 which is arranged to engage the knee pin 103 of the toggle 104 when the latter is in the toggle overcenter position, as indicated by the full lines 140 of FIG. 4.

To effect a disengagement of the nose 132 of the release pawl 133 at a proper time during the opening operation, there is provided a pawl-release stop 141, secured to the side wall 130 of mechanism housing 17.

Fixedly secured to, and carried by, the main operating shaft 18 is an arm 142, which strikes, in abutting manner, a pivotally mounted spring seat 143, pivotally connected, as at 144, to the inner end of a movable spring rod 145. The spring rod 145 slidably protrudes through an aperture 146, provided in the side wall 130 of mechanism housing 17, and has the outer end thereof threaded to accommodate an adjusting nut 147. Suitable means, not shown, may be provided to maintain the adjusting nut 147 in its proper position once the correct adjustment thereof has been made.

In the fully closed-circuit position of the load-break disconnecting switch 1, as indicated by the dotted lines 27 of FIG. 1, the electrical circuit therethrough includes line terminal connection 8, through conducting housing 9, conducting disconnecting switch blade 10 through contact portion 25 thereof to stationary jaw contact 13. The circuit then extends to the right-hand terminal pad 8A of the interrupter 1.

During the opening operation, suitable mechanism, disposed within cam housing 11 and described in the aforesaid Rawlins patent, effects upward, swinging, opening motion of the disconnecting switch blade 10, so as to cause the separation of the contacting end 25 thereof away from stationary jaw contact 13. It then makes engagement with discs 20 of rotatable contact arm 19, which is, at this time, in the position indicated by the dotted lines 29 of FIG. 1. The upward movement of the contacting end 25 of switch blade 10 from the left-hand end of contact bar 31 of the auxiliary isolating switch 30, as viewed in FIG. 2, permits the tension spring 31A thereof to cause engagement between the right-hand end of contact bar 31 and the stationary contact 34 to complete the electrical circuit through the adjacently disposed interrupting element 15.

The circuit now extending through the interrupter 1 includes left-hand connector 8, cam housing 9, disconnecting switch blade 10, contacting end 25 thereof, resilient discs 20, contact arm 19, shaft 18, conducting mechanism housing 17, flexible connector 128 (FIG. 3), movable contact operating rod 38, annular arcing contact 37 (FIG. 6), finger contacts 60, base plate 35, strap connection 35A (FIG. 2), stationary contact 34, pivotally mounted contact bar 31, support bracket 33 to line connection 8A.

The engagement of the contacting end 25 of disconnecting switch blade 10 with discs 20, at the outer free end of contact arm 19, causes the clockwise rotation of contact arm 19 and main shaft 18 along with the opening swinging movement of switch blade 10. With reference to FIG. 4, it will be noted that the slot 132 on shaft 18 engages toggle-release pawl 133, and causes the arm 136 to rotate with shaft 18 to effect engagement of the hook portion 139 with knee pin 103 of toggle 104, which, in the closed position of the switch, is in the overcenter toggle position, as indicated by the full lines 140 of FIG. 4. The toggle-breaking arm 138 will, therefore, break the toggle 104, and permit the opening accelerating spring 41 to quickly effect contact separation independently of the movement of the external contact arm 19 or the switch blade 10. Since the contact separating movement is solely dependent upon accelerating spring 41, and independent of the other linkage, contact separating motion takes place with arc-extinguishing occurring in the manner described previously in connection with FIGS. 5 and 6 of the drawings.

Further clockwise rotatable motion of the operating shaft 18 will cause engagement of the pawl 133 against the release stop 141, and cam the pawl nose 132 out of the slot 131 provided on the shaft 18. Due to the weight of the arm 136, slidably mounted on shaft 18, the arm 136 will drop back to its reset position, as illustrated in FIG. 4, suitable stops, not shown, being provided. The shaft 18, however, continues to rotate clockwise, during such an opening operation of the switch 1, until the outer end of the contacting portion 25 of switch blade 10 moves from beneath the discs 20 of contact arm 19 separating therefrom. The contact arm 19, then, due to its weight, will fall back until the slot 95 (FIG. 3) engages pawl nose 96, thereby bringing contact arm 19 to a halt, so that it will now assume the full-line position 19 of FIG. 1. The disconnecting switch blade 10 continues onward in its opening counterclockwise rotative travel to the fully open disconnecting position illustrated by the full lines in FIG. 1.

To effect a closing operation of the disconnecting switch 1, the crank arm 7 is operated so as to effect rotation of rotatable insulator stack 4. This will correspondingly effect, through the mechanism disposed within cam housing 11, clockwise closing movement of disconnecting switch blade 10.

The position of the discs 20 and contact arm 19, as shown by the full lines in FIG. 1, is such as to be interposed in the closing path of the outer extremity 25A of contact portion 25. As a result, the contact portion 25 of switch blade 10 will force the contact arm 19 to begin closing, counterclockwise rotative motion about shaft axis 18. It is to be noted at this point that the circuit is completed through the several connections, as previously noted, with the exception that the contact structure 36, 37 of interrupting element 15 is in its open position, as shown in FIG. 5. Otherwise the circuit is in readiness for circuit closing since the tension spring 31A of auxiliary isolating switch 30 has already effected the closing of this switch.

With reference to FIG. 3 of the drawings, it will be apparent that the closing counterclockwise rotation of shaft 18, as effected by engagement of contact portion 25 of switch blade 10 with discs 20 will cause the cam plate 100 to rotate therewith, since nose 96 of pawl 97 is in the slot 95 of shaft 18 at this time.

The cam edge 100A of cam plate 100 will bear against the knee pin 103 of toggle 104, and force it downwardly, as viewed in FIG. 3, to the overcenter toggle position, as indicated by the dotted lines 12 of FIG. 3. This will effect compression of accelerating spring 41, and consequent closing of the contact structure 36, 37 of FIG. 5. The circuit will now be completed through the interrupting element 15 of disconnecting switch 1.

The switch blade 10 continues onward to the extremity of its closing stroke, causing engagement between contact portion 25 thereof and stationary jaw contact 13. This bypasses the interrupting element 15, and effects opening of the auxiliary isolating contact 30 to remove potential from the interrupting element 15.

It is to be noted that after cam plate 100 has brought the toggle 104 to an overcenter position, as indicated by the dotted lines 12 of FIG. 3, the pawl-release stud 129 will cam the nose 96 of pawl 97 out of slot 95, and permit a helical spring 148 to return the cam plate 100 to its upper position, as shown by the full lines in FIG. 3. This helical spring 148 encircles the shaft 18, and is connected at one end to a fixed terminal stud 148A movable with the shaft 18. The other end of the helical spring 148 is secured to a stud 148B fixed to the cam plate 100.

It will also be noted that in the fully closed-circuit position of the interrupter, the compression spring 115 tends to maintain the toggle 104 in its overcenter position against the toggle stop 106. The arrangement is such that the extremity 25A of contacting portion 25 of switch blade 10 must push the discs 20 out of the way at the extreme end of the closing stroke, so that the spring 149 (FIG. 4) can return the shaft 18 slightly backwardly in a clockwise direction, so that the external contact arm 19 will be in the position indicated by the dotted lines 29 of FIG. 1, so that during the subsequent opening operation, the discs 20 will be reengaged by the contacting portion 25 of switch blade 10.

From the foregoing description it will be apparent that there are a number of novel features to the improved load-break disconnecting switch disclosed in our invention. First, a novel interrupting structure, as disclosed in FIGS. 5–8, interrupts the circuit, and is suitable to broad application, not necessarily being confined to load-break disconnecting switch application. The arc is compelled to assume a lengthened path, and is quickly extinguished by expulsive action.

Second, the provision of the auxiliary isolating switch 30 removes potential from the interrupting element 15 in the closed-circuit position of the device so as to eliminate deterioration of the fiber and to prevent radio interference. Third, a novel cam-operated toggle mechanism is provided to quickly bring about contact separation, and to permit the use of a single external contact arm 19, without the necessity of employing an auxiliary contact arm between the cam housing 11 and the mechanism housing 17, as shown in Lingal U.S. Patent 2,769,063. Other features of the invention are important in assuring smooth and effective operation.

Although there have been illustrated and described specific interrupting structures, and the application thereof to a novel load-break disconnecting switch, it is to be clearly understood that the same were merely for the purpose of illustration, and that changes and modifications may readily be made therein by those skilled in the art, without departing from the spirit and scope of the invention.

We claim as our invention:

1. In a load-break disconnecting switch having a pair of stationary conducting line terminals, a swinging movable connecting switch blade pivotally mounted adjacent one of said line terminals and making contacting engagement with the other line terminal, operating means for effecting arcuate movement of the free end of said movable disconnecting switch blade into and out of contacting engagement with said other line terminal to complete or open the electrical circuit therebetween, an interrupting element stationarily mounted at one end adjacent said other line terminal and including casing structure, a pair of separable arcing contacts disposed interiorly of said casing structure for effecting arc extinction interiorly of said casing structure, an oscillatable actuating arm pivotally mounted adjacent the other end of said casing structure and making abutting engagement with the free arcuately movable end of said pivotally mounted disconnecting switch blade during the opening and closing movements of the switch, actuating means for effecting opening and closing movements of said separable arcing contacts and connected to said oscillatable actuating arm, the combination therewith of an insulating support for stationarily supporting said interrupting element adjacent said other line terminal, an auxiliary switch disposed externally of said casing structure and electrically interconnecting one of said separable arcing contacts with said other line terminal, said auxiliary switch being actuated by the free end of the disconnecting switch blade, and the auxiliary switch being arranged to electrically connect said one separable arcing contact to said other line terminal during switch opening movement and to electrically isolate said one separable arcing contact and said other line terminal in the closed-circuit position of the disconnecting switch.

2. A load-break disconnecting switch including a pair of spaced line terminals, swinging movable disconnecting switch blade means pivotally supported adjacent one of said line terminals and having the free arcuate end of the pivotally supported switch blade means making contacting engagement with the other line terminal, operating means for effecting swinging opening and closing movements of the pivotally supported switch blade means, an arc-extinguishing interrupting device stationarily supported adjacent said other line terminal and including casing structure, a pair of separable arc-establishing contacts disposed interiorly of said casing structure, said interrupting device having one end thereof supported adjacent said other line terminal and the other end thereof extending away from said other line terminal and adjacent the opening path of movement of the free end of the pivotally supported switch blade means, said other end of the casing structure including a mechanism housing enclosing an actuating means for said pair of separable arc-establishing contacts, a rotatably mounted actuator arm extending laterally of said mechanism housing and engageable with the free end of said switch blade means during both its switch-opening and switch-closing movements, the current path through the switch blade means during the opening and closing movements traversing said rotatable actuator arm, said actuating means including a toggle linkage for effecting opening and closing movements of said pair of separable arc-establishing contacts, cam means having a releasable connection with said rotatable actuator arm to straighten said toggle linkage to effect thereby closing of the arc-establishing contacts during the closing operation of the switch blade means, and toggle-breaking means having a releasable connection with said rotatable actuator arm for breaking said toggle linkage during the opening rotative movements of the switch blade means, whereby the electrical circuit through the load-break disconnecting switch is made and broken interiorly of said casing structure and not at said switch blade means.

3. A load-break disconnecting switch including a pair of spaced line terminals, swinging movable disconnecting switch blade means pivotally supported adjacent one of said line terminals and having the free arcuate end of the pivotally supported switch blade means making contacting engagement with the other line terminal, operating means for effecting swinging opening and closing movements of the pivotally supported switch blade means, an arc-extinguishing interrupting device stationarily supported adjacent said other line terminal and including casing structure, a pair of separable arc-establishing contacts disposed interiorly of said casing structure, said interrupting device having one end thereof supported adjacent said other line terminal and the other end thereof extending away from said other line terminal and adjacent the opening path of movement of the free end of the pivotally supported switch blade means, said other end of the casing structure including a mechanism housing enclosing an actuating means for said pair of separable arc-establishing contacts, a rotatably mounted actuator arm extending laterally of said mechanism housing and engageable with the free end of said switch blade means during both its switch-opening and switch-closing movements, the current path through the switch blade means during the opening and closing movements traversing said rotatable actuator arm, said actuating means including a toggle linkage for effecting opening and closing movements of said pair of separable arc-establishing contacts, said toggle-linkage moving to an over-center position in the closed position of the arc-establishing contacts, means defining an over-center stop for said toggle linkage, cam means having a releasable connection with said rotatable actuator arm to straighten said toggle linkage to effect thereby closing of the arc-establishing contacts during the closing operation of the switch blade means, and toggle-breaking means having a releasable connection with said rotatable actuator arm for breaking said toggle linkage during the opening rotative movements of the switch blade means, whereby the electrical circuit through the load-break disconnecting switch is made and broken interiorly of said casing structure and not at said switch blade means.

4. A load-break disconnecting switch including a pair of spaced line terminals, swinging movable disconnecting switch blade means pivotally supported adjacent one of said line terminals and having the free arcuate end of the pivotally supported switch blade means making contacting engagement with the other line terminal, operating means for effecting swinging opening and closing movements of the pivotally supported switch blade means, an arc-extinguishing interrupting device stationarily supported adjacent said other line terminal and including casing structure, a pair of separable arc-establishing contacts disposed interiorly of said casing structure, said interrupting device having one end thereof supported adjacent said other line terminal and the other end thereof extending away from said other line terminal and adjacent the opening path of movement of the free end of the pivotally supported switch blade means, said other end of the casing structure including a mechanism housing enclosing an actuating means for said pair of separable arc-establishing contacts, a rotatably mounted actuator arm extending laterally of said mechanism housing and engageable with the free end of said switch blade means during both its switch-opening and switch-closing movements, the current path through the switch blade means during the opening and closing movements traversing said rotatable actuator arm, said actuating means including a toggle linkage for effecting opening and closing movements of said pair of separable arc-establishing contacts, a main operating shaft for supporting said actuator arm, a toggle-operating cam plate rotatably mounted on said main operating shaft and having a cam pawl pivotally mounted thereon, means defining a slot along said main operating shaft for engaging said cam pawl, the cam plate camming said toggle linkage to a straightened position to effect thereby closing of the arc-establishing contacts during the closing operation of the switch blade means, a pawl release for releasing said cam pawl at a predetermined point in the closing operation, and toggle-breaking means having a releasable connection with said rotatable actuator arm for breaking said toggle linkage during the opening rotative movements of the switch blade means, whereby the electrical circuit through the load-break disconnecting switch is made and broken interiorly of said casing structure and not at said switch blade means.

5. In a load-break disconnecting switch having a pair of stationary conducting line terminals, a swinging movable disconnecting switch blade pivotally mounted adjacent one of said line terminals and making contacting engagement with the other line terminal, operating means for effecting arcuate movement of the free end of said movable disconnecting switch blade into and out of contacting engagement with said other line terminal to complete or open the electrical circuit therebetween, an interrupting element stationarily mounted at one end adjacent said other line terminal and including casing structure, a pair of separable arcing contacts disposed interiorly of said casing structure for effecting arc extinction interiorly of said casing structure, an oscillatable actuating arm pivotally mounted adjacent the other end of said casing structure and making abutting engagement with the free arcuately movable end of said pivotally mounted disconnecting switch blade during the opening and closing movements of the switch, actuating means for effecting opening and closing movements of said separable arcing contacts and connected to said oscillatable actuating arm, the combination therewith of an insulating support for stationarily supporting said interrupting element adjacent said other line terminal, an auxiliary switch disposed externally of said casing structure and electrically interconnecting one of said separable arcing contacts with said other line terminal, said auxiliary switch including a pivotally-mounted contact arm and being actuated by the free end of the disconnecting switch blade, and the auxiliary switch being arranged to electrically connect said one separable arcing contact to said other line terminal during switch opening movement and to electrically isolate said one separable arcing contact and said other line terminal in the closed-circuit position of the disconnecting switch.

References Cited in the file of this patent

UNITED STATES PATENTS

| | | |
|---|---|---|
| 1,953,615 | King | Apr. 3, 1934 |
| 2,223,975 | Travers | Dec. 3, 1940 |
| 2,469,203 | Palme et al. | May 3, 1949 |
| 2,671,144 | Dickinson | Mar. 2, 1954 |
| 2,838,636 | Schwager | June 10, 1958 |
| 2,845,510 | Biersack | July 29, 1958 |
| 2,897,323 | Krase et al. | July 28, 1959 |